US009975622B2

(12) United States Patent
Snook (10) Patent No.: US 9,975,622 B2
(45) Date of Patent: May 22, 2018

(54) MORPHING FOIL OR WING (71) Applicant: Blue Bear Systems Research Limited, Bedford (GB)

(72) Inventor: Michael Snook, Bedford (GB)

(73) Assignee: Blue Bear Systems Research Limited, Bedford (GB)

( * ) Notice: Subject to any disclaimer, the term of this patent is extended or adjusted under 35 U.S.C. 154(b) by 446 days.

(21) Appl. No.: 14/660,184

(22) Filed: Mar. 17, 2015

(65) Prior Publication Data

US 2016/0176502 A1 Jun. 23, 2016

Related U.S. Application Data (63) Continuation of application No. PCT/EP2013/069291, filed on Sep. 17, 2013.

(30) Foreign Application Priority Data

Sep. 17, 2012 (GB) .................................. 1216553.6

(51) Int. Cl.
*B64C 3/54* (2006.01)
*B64C 3/40* (2006.01)
*B64C 39/02* (2006.01)

(52) U.S. Cl.
CPC ................ *B64C 3/546* (2013.01); *B64C 3/40* (2013.01); *B64C 3/54* (2013.01); *B64C 39/024* (2013.01); *B64C 2003/543* (2013.01); *B64C 2201/102* (2013.01); *Y02T 50/145* (2013.01)

(58) Field of Classification Search
CPC .. B64C 3/546; B64C 3/40; B64C 3/54; B64C 39/024; B64C 33/02
See application file for complete search history.

(56) References Cited

U.S. PATENT DOCUMENTS

| 1,485,163 | A | | 2/1924 | Braun |
| 2,783,955 | A | | 3/1957 | Fitzpatrick |
| 3,540,149 | A | * | 11/1970 | Lowe ..................... A63H 27/00 446/67 |

(Continued)

FOREIGN PATENT DOCUMENTS

| DE | 1050664 B | 2/1959 |
| DE | 3537365 A1 | 4/1987 |

(Continued)

OTHER PUBLICATIONS

Combined Search and Examination Report issued by United Kingdom Intellectual Property Office for Application No. GB1216553.6 dated Jan. 14, 2013 (3 pgs.).

(Continued)

*Primary Examiner* — Assres H Woldemaryam (74) *Attorney, Agent, or Firm* — Wilmer Cutler Pickering Hale and Dorr LLP (57) ABSTRACT Embodiments of the present invention relate to an adaptable wing having a variable geometry for influencing aerodynamic performance, the wing comprising a jointed leading edge having a main pivot, and a wrist joint, with a wing arm therebetween, and a distal wing hand depending from the wrist joint; the wing being reciprocally actuable, via the main pivot and wrist joint, between a first state having an extended wing planform and a second state having a tucked wing planform.

29 Claims, 9 Drawing Sheets (56) References Cited

U.S. PATENT DOCUMENTS

| | | | | |
|---|---|---|---|---|
| 3,830,449 A | * | 8/1974 | Schoffmann | B64C 33/02 244/11 |
| 2012/0185181 A1 | * | 7/2012 | Chankaya | B64C 23/065 702/41 |
| 2015/0210389 A1 | * | 7/2015 | Murdock | B64C 33/025 244/22 |

FOREIGN PATENT DOCUMENTS

| | | |
|---|---|---|
| FR | 726832 A | 6/1932 |
| FR | 740800 A | 2/1933 |
| GB | 289829 A | 10/1928 |
| GB | 2209727 A | 5/1989 |
| WO | WO2008125868 * 10/2008 | ............... B64C 3/40 |
| WO | WO-2008125868 A2 | 10/2008 |

OTHER PUBLICATIONS

International Search Report and Written Opinion issued by the European Patent Office as International Searching Authority for International Application No. PCT/EP2013/069291 dated Jan. 7, 2014 (12 pgs.).

* cited by examiner

MORPHING FOIL OR WING

CROSS REFERENCE TO RELATED APPLICATIONS

This application is a continuation of and claims priority to International Application No. PCT/EP2013/069291, filed Sep. 17, 2013, entitled "Variable Geometry Wing", which claims the benefit of priority of United Kingdom Patent Application No. 1216553.6, filed Sep. 17, 2012, the disclosures of each of which are incorporated by reference in their entirely.

FIELD OF THE INVENTION

Embodiments of the present invention relate to a morphing foil or wing and vehicle comprising such a foil or wing.

BACKGROUND TO THE INVENTION

It is well known to change the planform, via wing configuration changes, to achieve varying performance objectives for aircraft. For example, modern combat planes have variable sweep wing geometries that are deployed according to immediate performance requirements such as subsonic cruising, take-off and landing, which will have a corresponding, high-aspect ratio wing geometry, as compared to supersonic flight, which will have a different corresponding geometry, such as fully-swept back wings to mitigate drag. Such combat planes include, for example, the Panavia Tornado, F-14 Tomcat and MiG-27. Being able to make significant geometric changes to an aircraft's wing during flight increases the flexibility and overall suitability of the aircraft for disparate missions or disparate parts of a mission. However, such wings are very complex, introduce complex control issues and are highly expensive and therefore inappropriate for unmanned air vehicles (UAVs).

Furthermore, there is significant interest in biologically inspired technologies. Avian and marine biological systems comprising aerodynamic or hydrodynamic surfaces provide useful insights into balancing performance requirements of air and marine vehicles in terms of, for example, the lift/drag ratio, roll, pitch and yaw control and stability.

SUMMARY OF INVENTION

Accordingly, embodiments of the present invention provide an adaptable wing having a variable geometry for influencing aerodynamic performance, the wing comprising a jointed leading edge having a main pivot, and a wrist joint, with a wing arm therebetween, and a distal wing hand depending from the wrist joint; the wing being reciprocally actuable, via the main pivot and wrist joint, between a first state having an extended wing planform and a second state having a tucked wing planform.

Advantageously, the aerodynamic performance, such as, for example, loading, of the wing can be adapted to different states or phases of flight.

BRIEF DESCRIPTION OF THE DRAWINGS

Embodiments of the present invention will now be described, by way of example only, in which.

DETAILED DESCRIPTION OF PREFERRED EMBODIMENTS

Figure 1:
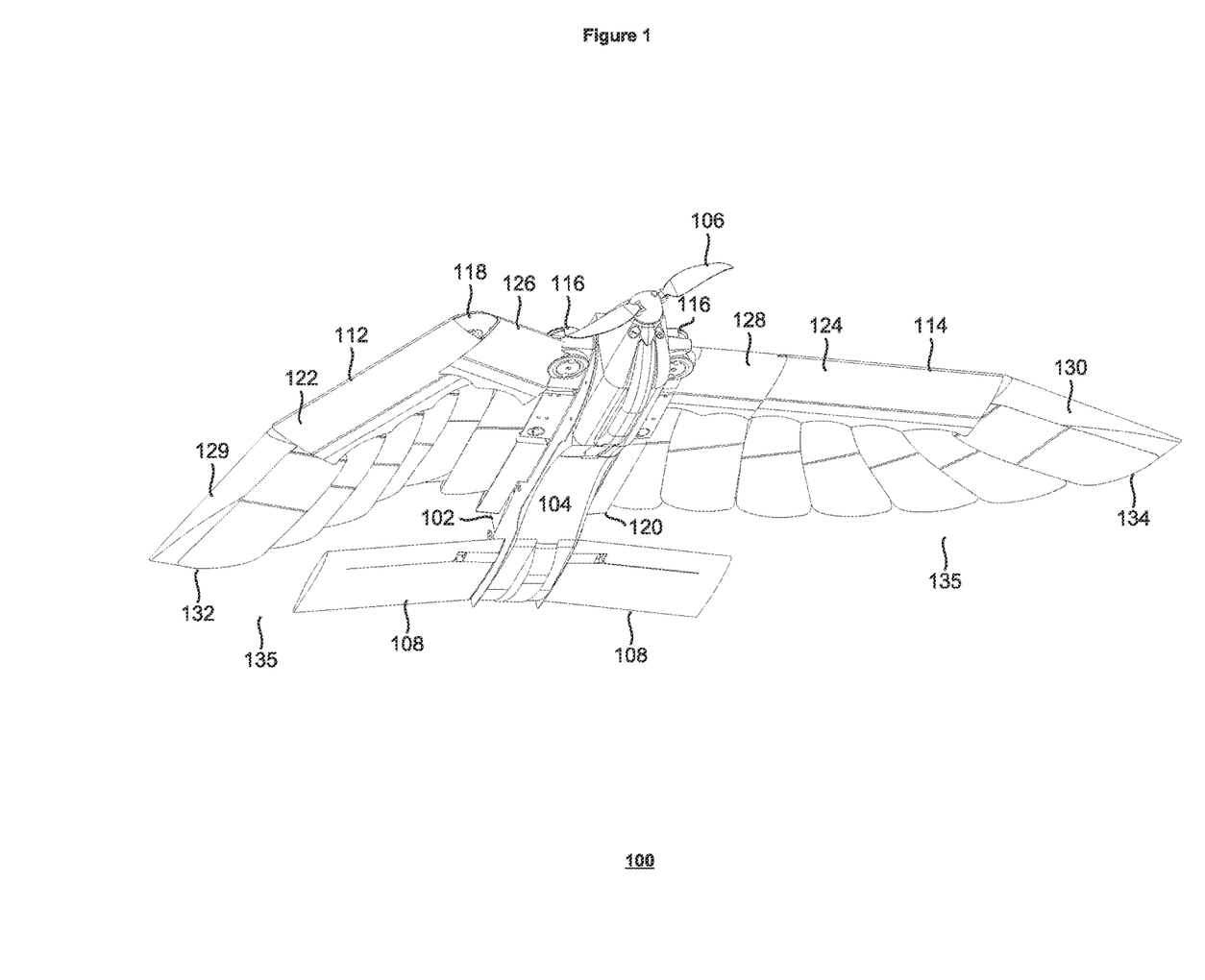
FIG. 1 is a perspective view of a UAV.

Referring to FIG. 1, there is shown a perspective view 100 of a UAV 102. The UAV 102 comprises a fuselage 104 bearing a propeller 106, tailerons 108 and a tail 110, as well as a pair of wings 112 and 114, coupled to the fuselage 104 via a housing 120.

The leading edge of the wings 112 and 114 is jointed. Each wing 112 and 114 comprises a main pivot 116 and a wrist joint 118. In the illustrated figure, only the right wrist joint is visible due to the wing 112 being in a tucked position or state, while the other wing 114 is in an extended position or state.

Each wing comprises a wing hand section 122 and 124, a wing arm section 126 and 128, and a tip fairing 129 and 130. Each wing also has a plurality of feathers 135, such as, for example the distal most feather 132 and 134 relative to the fuselage. In the present embodiment, each wing 112 and 114 has seven lower feathers, which are visible in FIG. 1 and seven upper feathers. The feathers 135 are arranged to overlap in the tucked state and/or overlap in the extended state to varying degrees.

Further details regarding the fuselage 104 are available in, for example, UK patent application nos. GB1106617.2 and PCT/GB2012/050856, which are incorporated herein by reference for all purposes.

Figure 2:
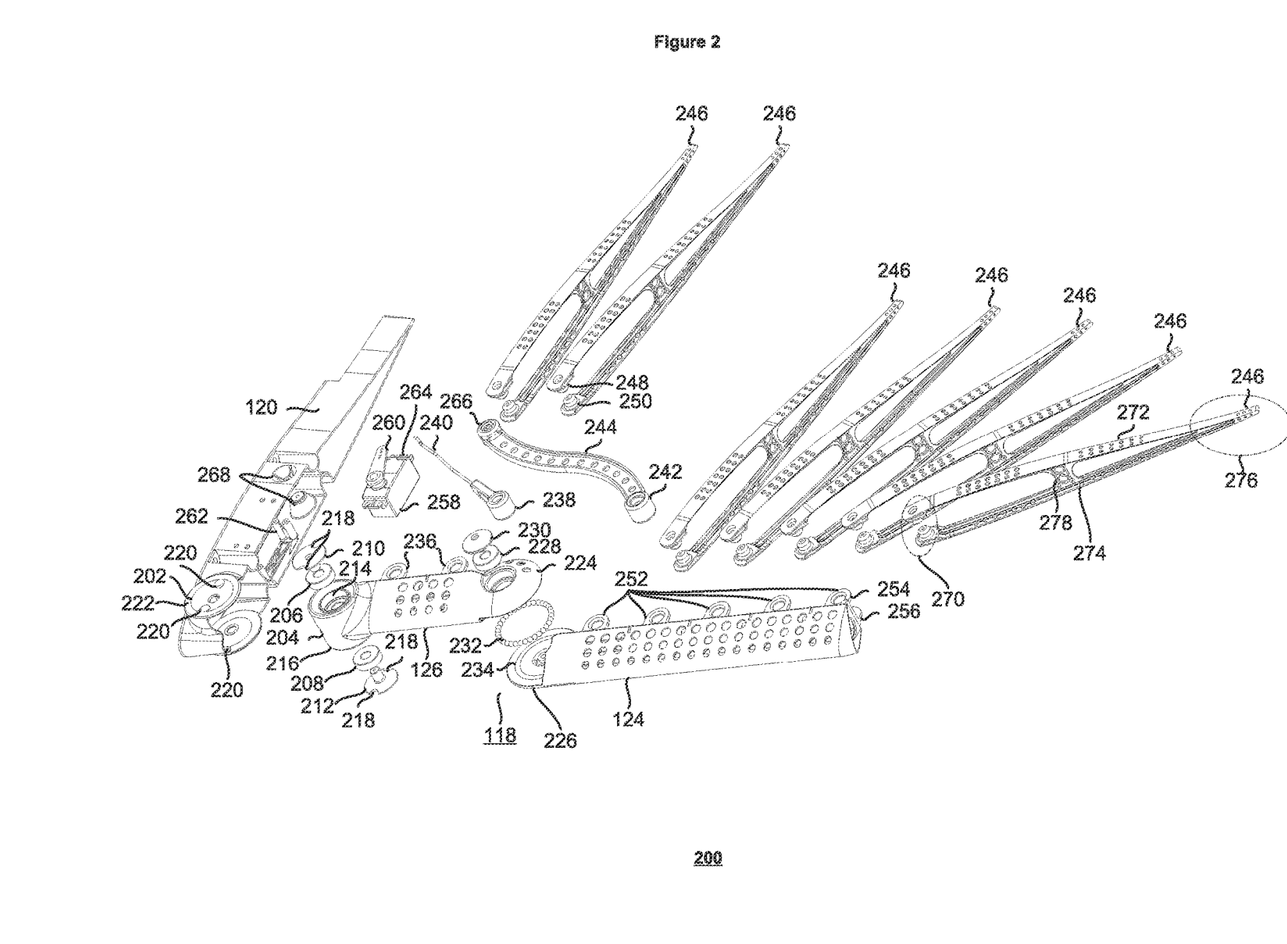
FIG. 2 shows an exploded view of a wing for the UAV.

FIG. 2 shows an exploded view 200 of an embodiment of the wings 112 and 114. The wing comprises the housing 120 for coupling the wing 112 and 114 to the fuselage 104. The housing comprises a main pivot housing 202 for receiving a main pivot hub 204 of the wing arm section 126 and 128. The main pivot 116 has upper and lower race bearings 206 and 208 and respective upper and lower retaining caps 210 and 212. Preferably, the race bearings comprise acetyl shells and steel balls to save weight. The bearings 206 and 208 are received by respective recesses 214 and 216 of the main pivot hub 204. It can be appreciated that only recess 214 is visible. The retaining caps 210 and 212 have complementary formations that cooperate to provide a non-rotating axis about which the wing arm section 126 and 128 can rotate. In the embodiment shown, those complementary formations take the form of recesses 218 that cooperate with respective lugs 220 on the upper and lower outer surfaces 222 of the main pivot housing 202. The retaining caps 210 and 212 are secured in place via a fastener (not shown).

The distal end of the wing arm section 126 and 128 comprises the wrist joint 118. The wrist joint 118 is formed from complementary portions of the wing arm section 126 and the wing hand section 124. In the embodiment shown, the complementary portions comprise a distal upper wrist joint portion 224 and a proximal lower wrist joint portion 226. The upper and lower wrist joint portions are arranged to receive a respective race bearing 228 and retaining cap 230. The race bearing facilitates free rotation of the wrist while holding it together. A race bearing 232 or the like is provided to facilitate smooth operation of the wrist joint 118. The race bearing is captured within respective tracks of the upper and lower wrist joint portions 224 and 234; only the track 234 of the lower wrist joint portion 226 is visible in FIG. 2. The wrist joint 118 is held together via a respective fastener (not shown). The distal end of the wing hand section 124 is adapted to cooperate with a complementary formation of the tip fairing 129 (not shown in FIG. 2).

The wing arm sections 126 and 128 have a number of engagement members. In the embodiment illustrated, the wing arm sections 126 and 128 comprise a pair of engagement members 236; although embodiments are not limited thereto. The engagement members 236 in preferred embodiments comprise upper and lower foraminated lugs; only the upper foraminated lugs are shown in FIG. 2. The upper and lower foraminated lugs have the same size and separation. The upper and lower lugs are adapted to be able to receive, where appropriate, one or more of a hub 238 of a servo linkage 240 and complementary formations of respective feather ribs 246. Preferred embodiments realise the complementary formations of respective feather ribs 246 using upper and lower spigots 248 and 250. Preferably, the spigots 248 and 250 form a snap fit with the upper and lower foraminated lugs. Preferred embodiments also provide nylons bolts that pass through the upper and lower spigots 248 and 250 to retain joint tolerance. In preferred embodiments the servo linkage hub 238 and the actuation linkage hub 240 are captured between the upper and lower spigots and secured in place by complementary recesses adapted to receive the free ends of the upper and lower spigots together with steel bolts passing through the hubs for strength and durability. The wing hand sections 122 and 124 also bear respective engagement members 252 that are identical in form and function to the engagement members 236 of the wing arm sections 126 and 128. The engagement members 252 are adapted to receive a hub 242 of an actuation linkage 244. Upper and lower foraminated lugs 254 and 256 of the distal most engagement member 252 are shown. In the illustrated embodiments the wing hand section comprises four such engagement members, but embodiments are not limited to such an arrangement. Embodiments can be realised in which more or fewer engagement members 252 are used.

FIG. 2 also shows a servo 258 having a servo arm 260. The servo arm 260 is arranged to rotate about a respective axis (not shown), in response to a received command, to move the wings between the extended and tucked positions via the servo linkage 240. In a preferred embodiment, the servo linkage hub 238 is coupled to wing arm section 126 and 128 via one of the engagement members 236. In the illustrated embodiment, the servo linkage hub 238 is coupled to the second or outer-most engagement member 236. Preferably, the servo arm 260 is biased, via a biasing member (not shown), towards first and second positions corresponding to the tucked and extended wing states. The servo arm biasing is provided, for example, by a spring (not shown) operable to provide tension either side of the axis (not shown) of the servo arm 260. The servo 258 is secured in position within the housing 120. In the illustrated embodiment, the servo 258 is secured in position within the housing by a number of housing columns 262 that cooperate with respective snap-fit jaws 264 of the servo 258.

The actuation linkage 244 bears, at a proximal end, a further boss 266 arranged to be received within the housing 120 and to pivot with respect to an axis (not shown) defined by respective housing fastenings 268. In the embodiment shown, the housing fastenings 268 are realised using frustoconical projections that are arranged to capture the actuation linkage 244 via a snap fit with complementary recesses within the further boss 266. Steel through bolts are also provided to secure the actuation linkage 244. Preferred embodiments of the actuation linkage 244 are non-linear. Preferably, the actuation linkage 244 is shaped to avoid contact with any other parts of the wing other than where intended, which is at the hubs 224 and 226. Still further, a preferred embodiment of the actuation linkage 244 is s-shaped. The actuation linkage 244 is coupled to a predetermined engagement member 252 of the wing hand section 122 and 124. In preferred embodiments, the actuation linkage 244 is coupled to the proximal most engagement member 252.

Each feather rib 246 has a cephalically disposed open end 270, bearing the spigots 248 and 250, that transitions, via upper and lower cambered sections 272 and 274, to a caudally disposed pointed section 276. The upper and lower cambered sections 272 and 274 are separated by a supporting strut 278. The upper and lower cambered sections 272 and 274 are arranged to receive respective feathers (described in detail hereafter with reference to FIG. 6) to define the shape of the upper and lower surfaces of the wings. Preferably, the upper 272 and lower 274 cambered sections are foraminated to save weight. The open end 270 is arranged, in use, to bias the spigots towards one another.

Figure 3:
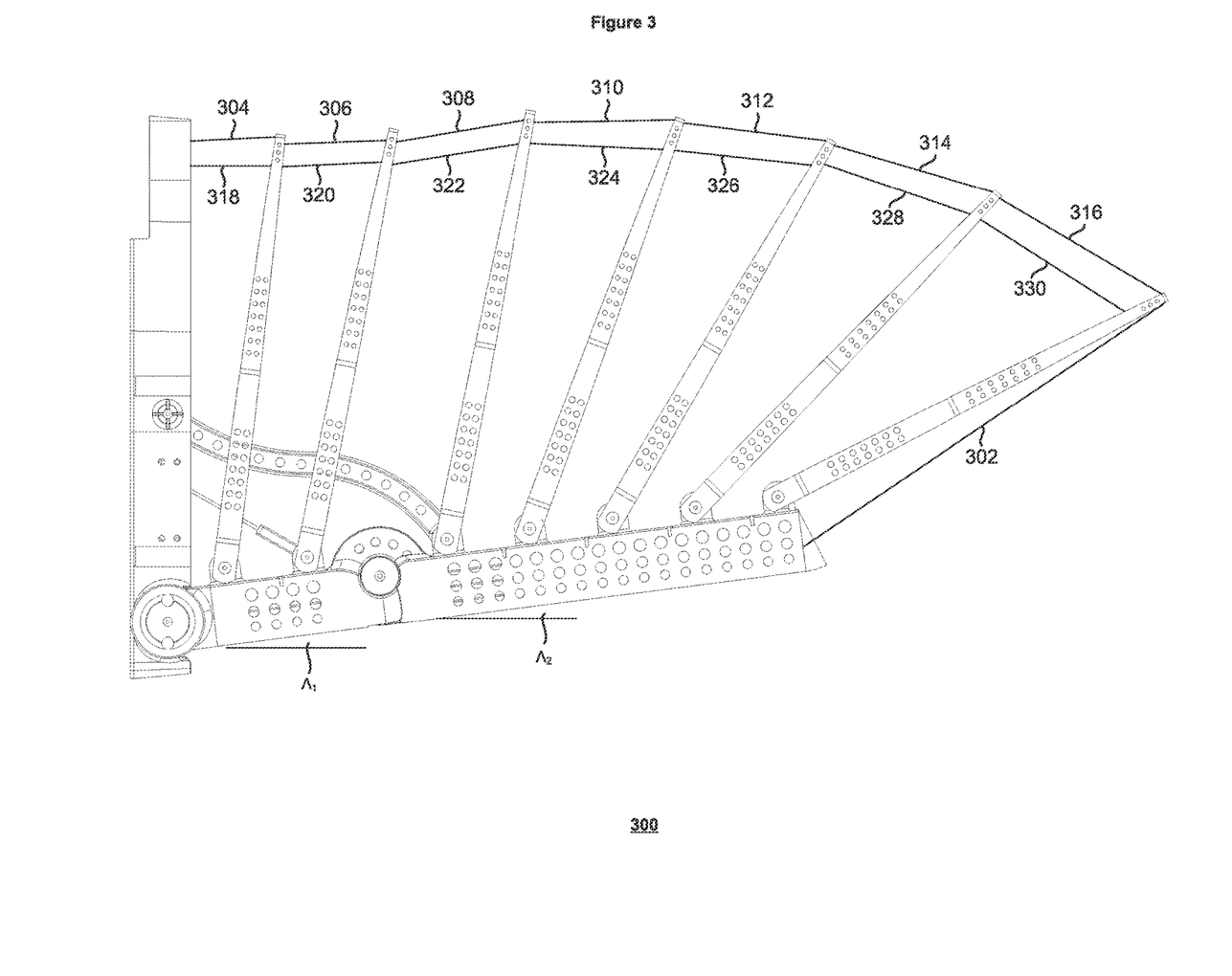
FIG. 3 depicts a view of a wing for the UAV in an extended position.

Referring to FIG. 3, there is shown a plan view 300 of one of the wings. The servo 258, servo linkage 240 and actuation linkage 244 cooperate to urge the wing into the extended position shown in FIG. 3. As the servo pulls the wing arm towards servo 258, or towards the fuselage 104 to provide a positive, reduced, sweep-back angle, $\Lambda_1$, (measured relative to a lateral axis of the vehicle), the actuation linkage 244 urges the wing hand section outwards away from the fuselage 104, that is, in such a manner as to provide a positive, increased, sweep-back angle, $\Lambda_2$. In a preferred embodiment, the sweep-back angle of the wing arm section and the sweep-back angle of the wing hand section are the same in the extended position. However, embodiments are not limited thereto. Embodiments can be realised in which the sweep angles are different, that is, wherein the wing, in its extended position, is a compound sweep wing. For example, the sweep-back angle of the wing arm section can be less than the sweep-back angle of the wing hand section in the extended position. As the servo 258 pushes the wing arm section away from the fuselage 104, that is, increases the sweep-back angle, $\Lambda_1$, the actuation linkage 244 operates to pull the wing hand section towards the fuselage 104, that is, reduces the sweep-back angle, $\Lambda_2$. It can be appreciated in the tucked position the sweep-back angle $\Lambda_1$ of the wing arm section may not be positive, that is, the wing arm section may be swept forward, as wing arm section 126 is depicted in FIG. 1.

Each wing contains a biasing member 302 that extends through the inside of at least one of the wing hand section and the wing arm section. Primarily, the biasing member is coupled to the tip fairing 129 and 130, or the outer most feather rib 246, and biased to urge the wing, in particular, the tip fairing 129 and 130, towards the extended position. This arrangement allows the wing tip to sweep passively in a rearward direction during, for example, an impact. Preferred embodiments use an elongate elastic member under tension to bias the tip fairing towards the extended position. In one embodiment, the biasing member is arranged to be under greater tension when the wing is in the tucked position as compared to the extended position. Embodiments can be realised in which the biasing member is coupled, and operable, between the wing hand section and the tip fairing. However, embodiments can be realised in which the biasing member passes through the wing hand section and is coupled at a point that is closer to the fuselage than the wrist joint 118 such that the biasing member, as well as urging the tip fairing towards the extended position, also acts on the wrist joint to urge it in a caudal direction, which, in turn, assists in urging the wing into the extended position.

Each of the feather ribs 246 is coupled to an adjacent feather rib, where appropriate, by a travel limiter that is arranged to limit the travel of the feather ribs towards the extended position. Preferred embodiments use a relatively inextensible nylon cord to realise the travel limiters. In the embodiment illustrated, seven travel limiters are shown 304 to 316. Preferably, the travel limiters 304 to 316 and 318 to 330 are disposed at predetermined corresponding positions relative to the wing chord. In preferred embodiments, the travel limiters 304 to 316 and 318 to 330 are disposed at substantially the half chord position. As the outer most feather rib is urged towards the extended position, it will be appreciated that the travel limiters also urge the other feather ribs towards the extended position. The relative increase in spacing between the feather ribs ceases when each travel limiter is fully extended. Each of the feather ribs 246 is also provided with feather rib biasing members 318 to 330 that are arranged to urge the feather ribs towards the fuselage. Preferred embodiments of the feather rib biasing members are realised using elongate resiliently deformable elastic members 318 to 330 arranged to be under increasing tension as the wing moves towards the extended position. Preferably, the feather rib biasing members 318 to 330 are also under tension when the wing is in the tucked position. Although embodiments have been described as using an inextensible chord to realise the travel limiters, embodiments are not limited to such an arrangement. Embodiments can alternatively use an elastic member that is arranged under tension to urge the feather ribs towards the extended position.

As the wing moves between the extended and tucked positions, the feather ribs will pivot about their respective axes defined by the engagement members 236 and 252 and the spigots 248 and 250 of the feather ribs.

Figure 4:
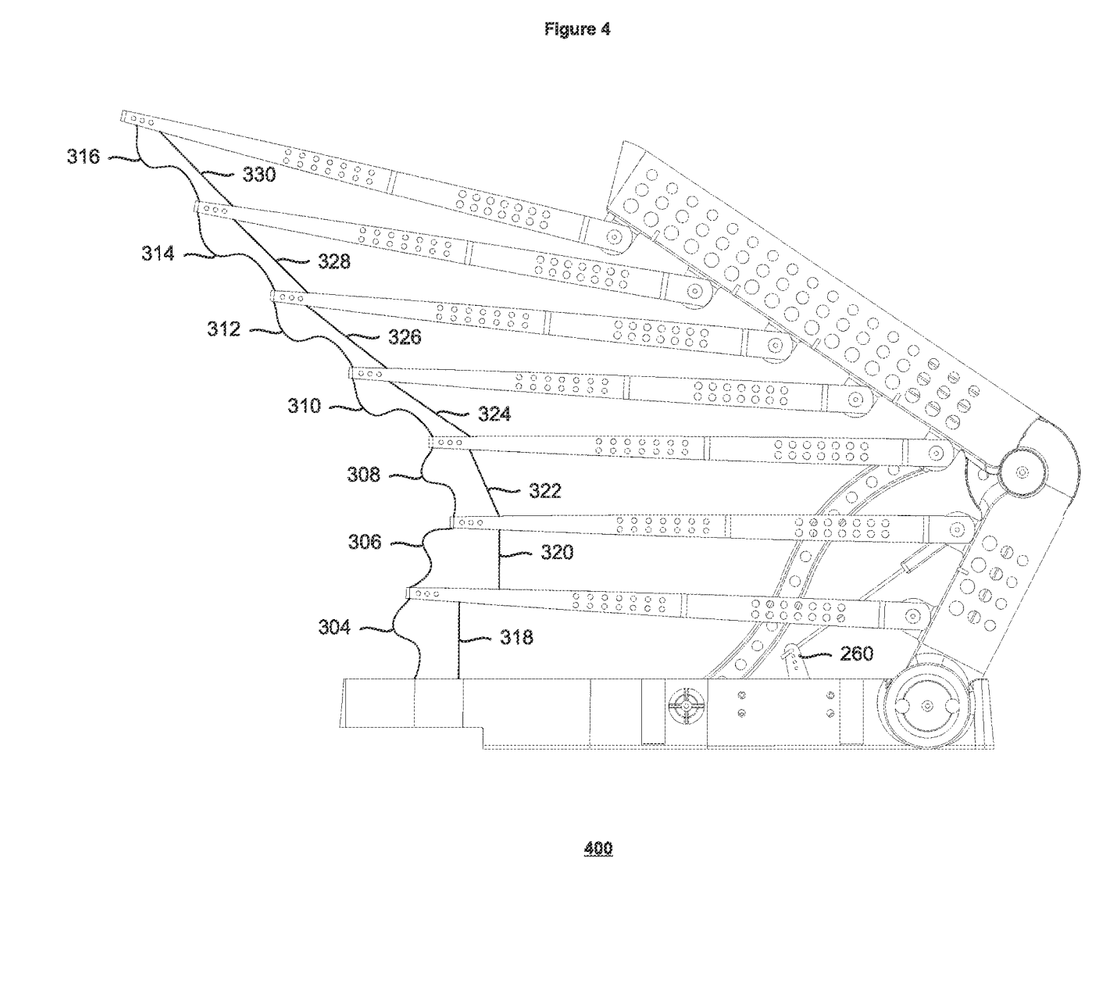
FIG. 4 shows a view of a wing for the UAV in a tucked position.

FIG. 4 shows a plan view 400 of the wing in the tucked position. It can be appreciated that the feather rib biasing members 318 to 330 are still under tension. It can be appreciated that the travel limiters 304 to 316 are not under tension. The servo arm 260 is visible and shown pushing the wing arm section towards the tucked position.

Figure 5:
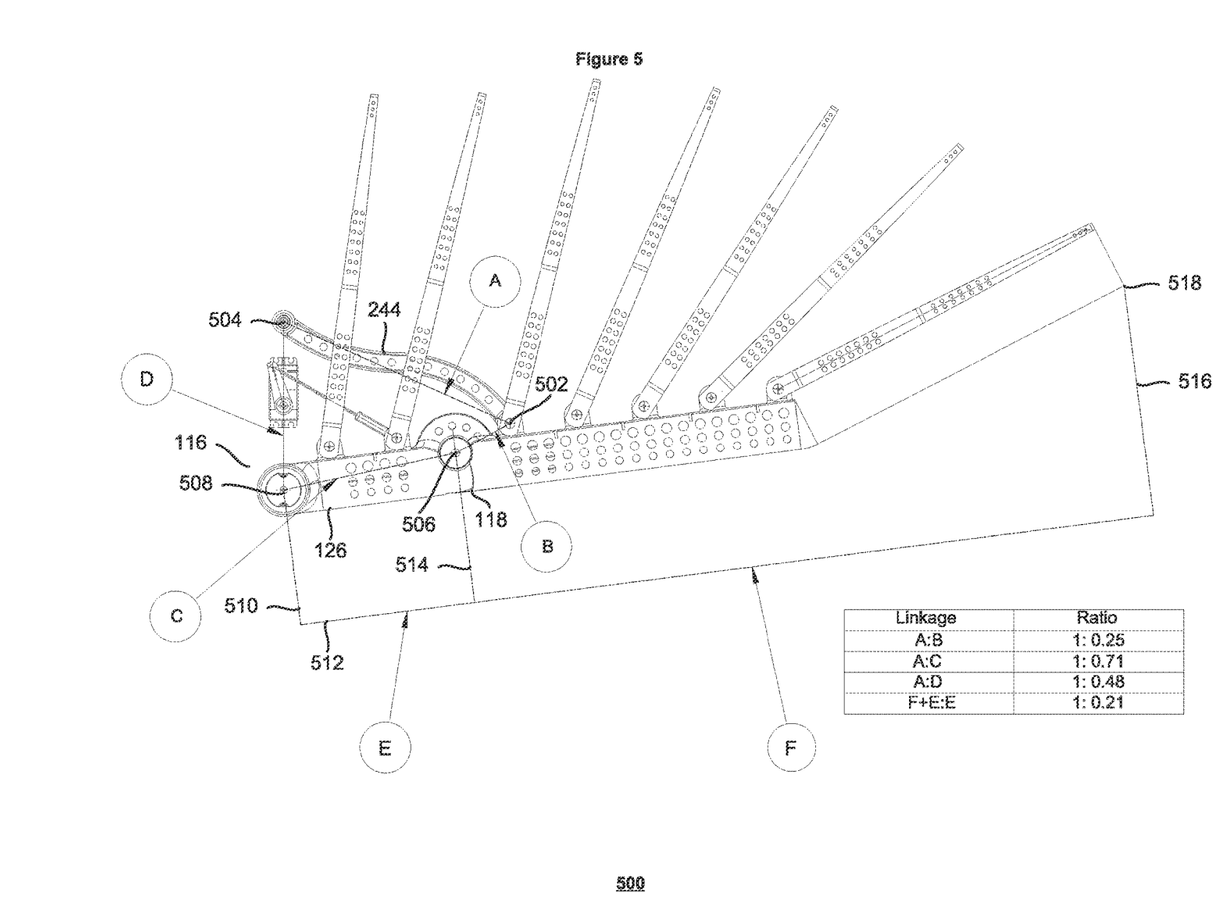
FIG. 5 illustrates the relative distances between a number of axes associated with the wing.

FIG. 5 provides a view 500 of the relative spacing and dimensions of the elements of the wings. In the following, all ratios are expressed for the wing in the fully extended position. The ratio, A:B, of the distance between the first 502 and second 504 axes of the actuation linkage 244 to distance between the first axis 502 of the actuation linkage 244 and the axis 506 of the wrist joint 118 is between 1:0.2 and 1:0.7 and is preferably 1:0.25. The ratio, A:C, of the distance between the first 502 and second 504 axes of the actuation linkage 244 to distance between axis of the wrist joint 506 and the axis 508 of the main pivot is between 1:0.1 and 1:0.8 and is preferably 1:0.71. The ratio, A:D, of the distance between the second axis 504 of the actuation linkage 244 and the axis 508 of the main pivot 116 is between 1:0.1 and 1:1.25 and is preferably 1:0.48. The ratio, F+E:E, of the sum of the distances E between a first normal 510, depending from the main pivot axis 508, to an axis 512 running parallel to the leading edge of the wing arm section 126 and a second normal 514, depending from the wrist joint axis 506, to the axis 512 and F between the second normal 514 to a third normal 516, depending from the tip fairing tip 518 to the axis 512 to the distance between the second normal 514 and the third normal measured along the axis 512 is between 1:0.1 and 1:0.6 and is preferably 1:0.21.

Figure 6:
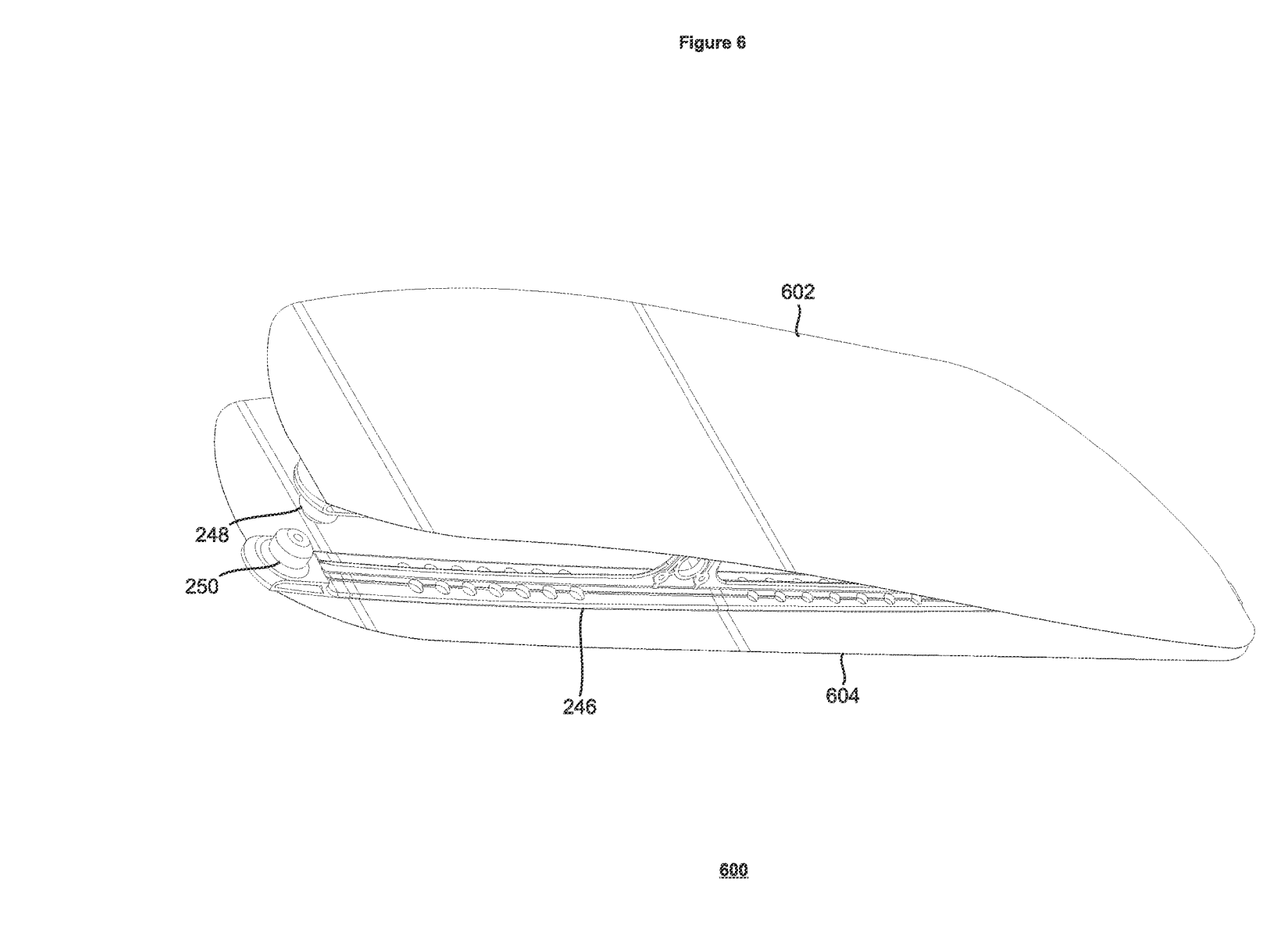
FIG. 6 depicts a view of a feather mounted on a feather rib.

FIG. 6 is a view 600 of a feather rib 246 bearing upper 602 and lower 604 feathers, that is, wing surface elements. Preferred embodiments use sheets of polyester film to realise the wing surface elements. The wing surface elements are arranged so that there is an overlapping relationship with adjacent wing surface elements when the wing is in the extended position. It will be appreciated that the degree of overlap will increase when the wing is in the tucked position. Embodiments can be realised in which a selectable edge, preferably, the trailing edge, of the wing surface elements are porous or foraminated to allow pressure leakage between the upper and lower surfaces of the wing, which serves to urge the feathers together in regions where there is an overlapping relationship between wing surface elements. Embodiments can be realised in which the porosity or foraminations to allow pressure leakage are adapted to vary in at least one of density and size to create a variable predetermined or intentional pressure leakage profile across the wing. The wing surface elements 602 and 604 have substantially the same length as the feather rib 246 and are between 4 and 7 times, preferably 5 to 6 times, as wide as the feather ribs 246. The upper and lower spigots 248 and 250 are clearly visible.

Figure 7:
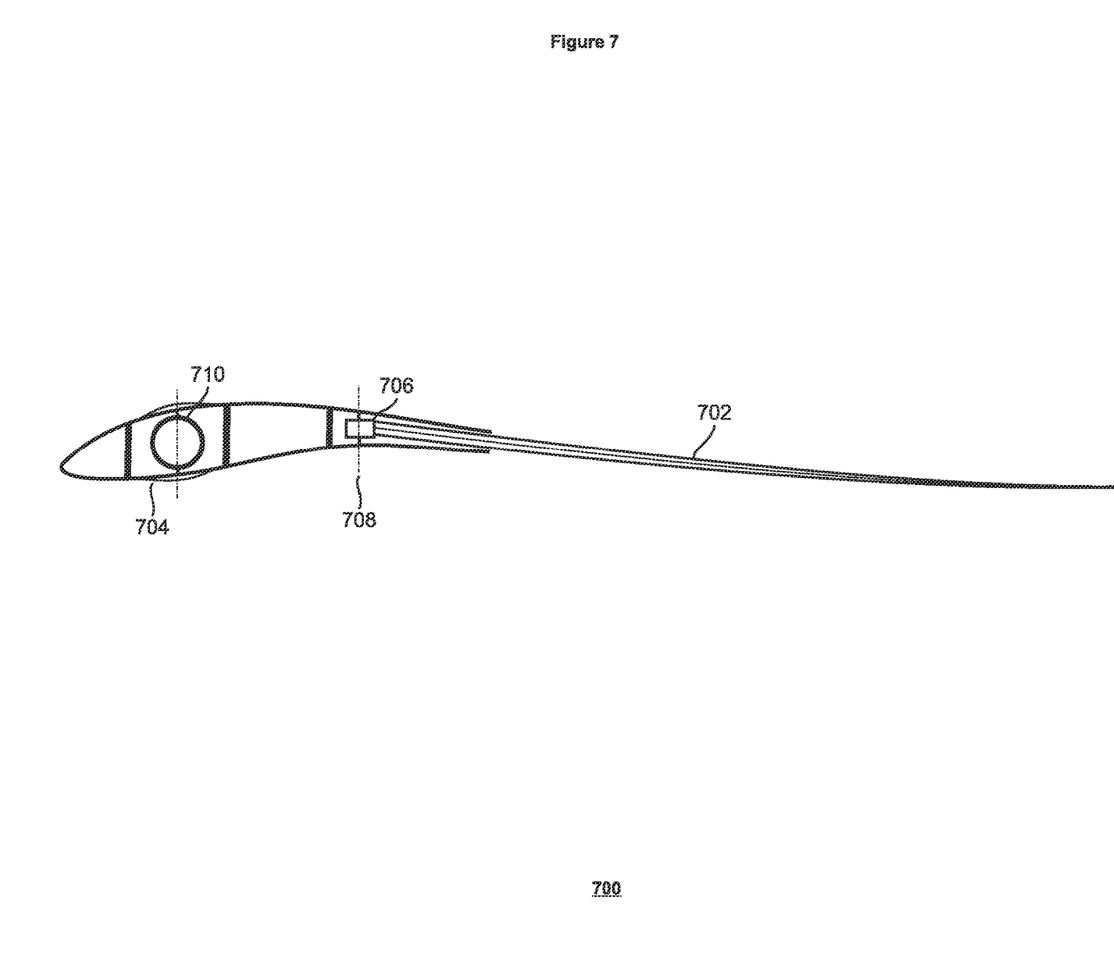
FIG. 7 is a side-sectional view of an alternative embodiment of a feather rib/wing surface element assembly.

FIG. 7 is a side-sectional view 700 of an alternative embodiment of a feather rib/wing surface element assembly. It can be appreciated that a primary difference between the assembly shown in FIG. 6 and that shown in FIG. 7 is that the latter has a single wing surface element 702. The wing surface element 702 is coupled to the leading edge of the wing 704, which can be at least one of either the wing arm section or wing hand section, via a hinge 706 that has an axis 708. The wing surface element 702 can pivot about the axis 708 in substantially the same manner as described above with respect to the feather ribs 246, it will be appreciated that a wing containing such single surface elements can be made lighter and can use a thinner wing section, which will reduce form or section drag.

Furthermore, the reduced thickness of the wing surface element 702 allows tailoring of the passive aeroelasticity, which allows it to be made more plastically deformable when operating at high angles of attack or during contact with other objects.

Embodiments of such an element 702 can be realised in which reinforcement for the wing is provided in the form of a composite or metal spar 710 because of the reduction in strength following from employing a thinner surface element.

Figure 8:
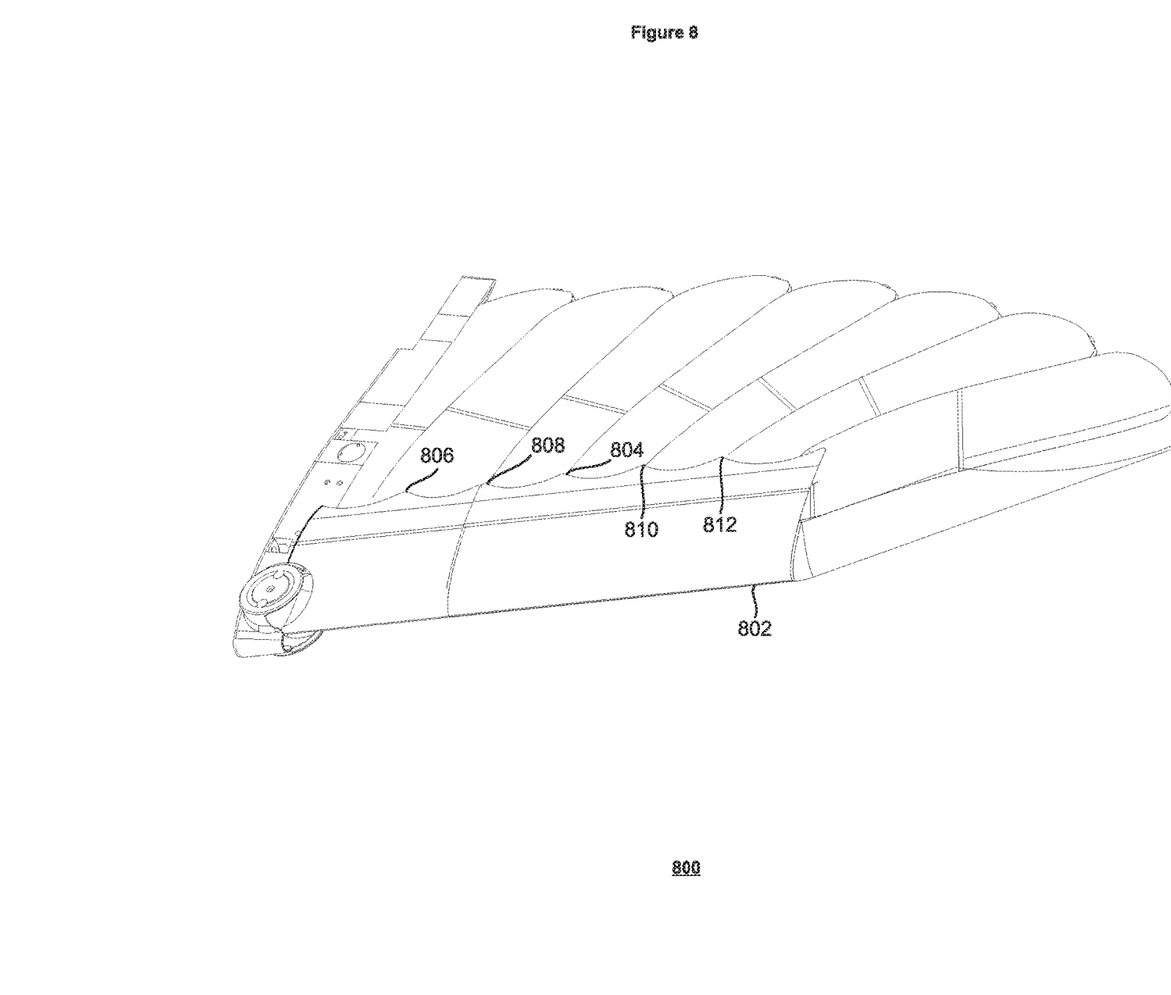
FIG. 8 shows a wing bearing a covert in an extended state.
Figure 9:
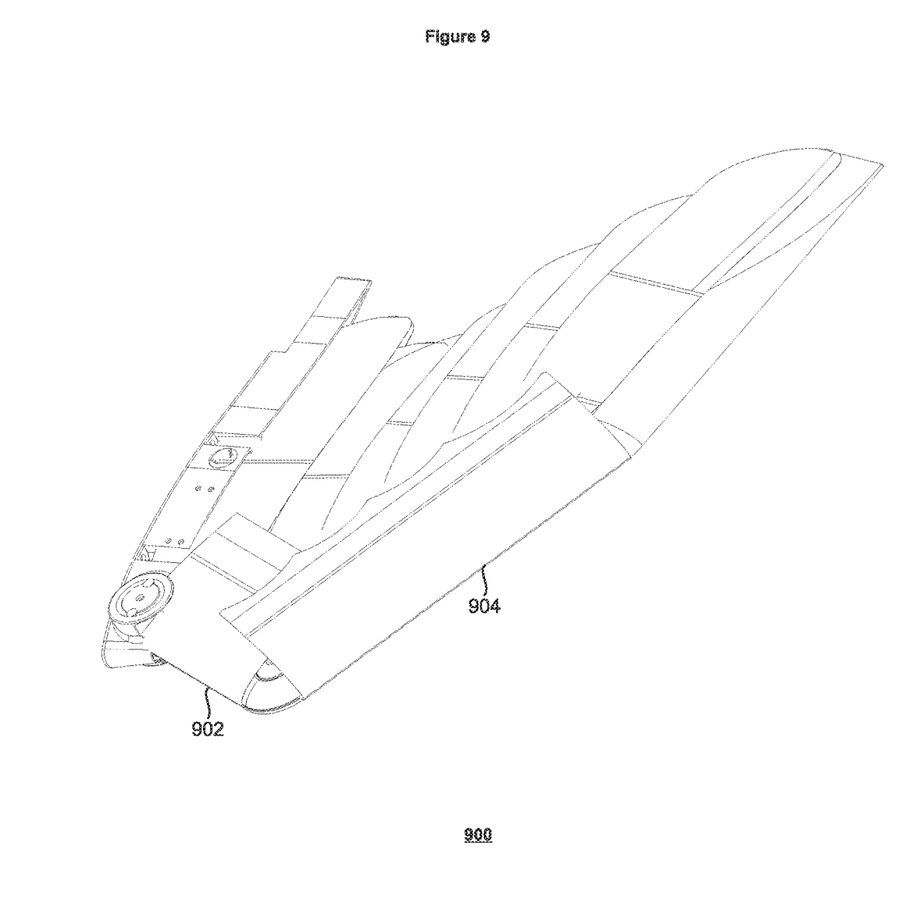
FIG. 9 shows a wing bearing a covert in a tucked state.

It can also be appreciated that embodiments can be realised in which the coverts around the hinge 706 may be part of the same component that forms the leading edge of the wing FIG. 8 is a view 800 of a wing having a leading edge covert 802. The covert 802 performs at least one, and preferably both, of improving or smoothing airflow over the wing and controlling pressure leakage between the lower and upper wing surfaces. The overlapping wing surface elements 602 and 604 exhibit gaps that form through-holes or vias between the wing surfaces. The sizes of the through-holes differ as between the tucked and extended positions. The covert 800 is adapted to influence any pressure leakage attributable to or associated with those through-holes, particularly those that manifest themselves in the extended position. Furthermore, it will be appreciated that the coverts are position in the area of the wing that produces the most lift. Therefore, it is preferable that they are secured in place so as to conform with or match the profile of the wing. Embodiments of the invention use clips, such as, for example steel clips, to secure the coverts in place. Preferably, the covert 800 has a profiled trailing edge 804. The profiled trailing edge 804 preferably has extensions or protrusions 806 to 812 arranged in registry with or to correspond to any such through-holes or other regions of adverse pressure leakage. It can be appreciated from FIG. 9, which shows a view 900 of the wing in a tucked position, that the leading edge covert 800 comprises two parts; the first part 902 forms a covert for the wing arm section and the second part 904 forms a covert for the wing hand section. It will be appreciated that a wing is an embodiment of a foil and that the term foil can encompass one or more of a wing, blade and/or sail; all for use in fluids such as gases and liquids. The terms foil, wing, blade and sail are used synonymously.

Although embodiments of the present invention have been described with reference to the wings having only tucked and extended positions, embodiments are not limited thereto. Embodiments can be realised in which the tension imparted by biasing member 302 is balanced by the tension imparted by biasing members 318 to 330 to maintain the wing in one or more intermediate positions between the fully tucked and fully extended positions. Additionally, or alternatively, although embodiments have been described in which the servo is operable to move the wing between fully extended and fully tucked positions, embodiments are not limited to such an arrangement. Embodiments can be realised in which the servo 258 positions the servo arm 260 at one or more intermediate positions between those that correspond to the fully tucked and fully extended positions.

The invention claimed is:

1. An adaptable wing having a variable geometry for influencing aerodynamic performance, the wing comprising:
   a jointed leading edge having a main pivot, and a wrist joint, with a wing arm therebetween; and
   a distal wing hand depending from the wrist joint;
   the wing being reciprocally actuable, via the main pivot and wrist joint, between a first state having an extended wing planform and a second state having a tucked wing planform, wherein:
      the wing arm and distal wing hand comprise respective D-box sections, each D-box section having a profiled leading section forming the leading edge and a rear section; the rear section having a respective depth;
      the rear section having depending therefrom one or more feather ribs pivotally coupled, via respective hinges, to the rear section; the one or more feathers comprising spaced apart upper and lower cambered sections arranged according to a predetermined camber profile.

2. The wing as claimed in claim 1, wherein a center of pressure or center of lift in the first state is different to the center of pressure or center of lift in the second state.

3. The wing as claimed in claim 2, wherein the center of pressure or center of lift in the second state is proximally disposed relative to the main pivot as compared to the first state in which the center of pressure or center of lift is distally disposed relative to the main pivot.

4. The wing as claimed in claim 2, wherein the center of pressure or center of lift in the second state is disposed fore or aft of the center of pressure of center of lift in the first state.

5. The wing as claimed in claim 4, wherein the center of pressure or center of lift in the second state is proximally disposed relative to the main pivot as compared to the first state in which the center of pressure or center of lift is distally disposed relative to the main pivot.

6. The wing as claimed in claim 1, wherein at least one of the wing arm and wing hand are foraminated.

7. The wing as claimed in claim 1, wherein the one or more feather ribs bear respective planar wing surfaces.

8. The wing as claimed in claim 1, wherein the one or more feather ribs are biased in a first direction.

9. The wing as claimed in claim 8, wherein the one or more feather ribs are biased towards the first state.

10. The wing as claimed in claim 8, wherein the one or more feather ribs are biased towards the first or second state.

11. The wing as claimed in claim 10, wherein the one or more feather ribs are biased towards the first state.

12. The wing as claimed in claim 1, wherein the one or more feather ribs have a respective travel limiter adapted to influence relative separation between the one or more feather ribs.

13. The wing as claimed in claim 1, wherein the extended wing planform provides a higher aspect ratio as compared to the tucked wing planform.

14. The wing as claimed in claim 1, wherein the extended wing planform provides a greater wing area as compared to the tucked wing planform.

15. The wing as claimed in claim 14, further comprising an actuator linkage adapted to urge the wrist joint in a first direction in response to a first servo or actuator direction and to urge the wrist joint in a second direction in response to a second servo or actuator direction.

16. The wing as claimed in claim 15, wherein the first direction and the first servo or actuator direction are opposite and wherein the second direction and the second servo or actuator direction are opposite.

17. The wing as claimed in claim 1 further comprising a servo adapted to drive the wing between the extended wing planform and the tucked wing planform.

18. The wing as claimed in claim 17 further comprising an actuator linkage adapted to urge the wrist joint in a first direction in response to a first servo or actuator direction and to urge the wrist joint in a second direction in response to a second servo or actuator direction.

19. The wing as claimed in claim 18, wherein the first direction and the first servo or actuator direction are opposite and wherein the second direction and the second servo or actuator direction are opposite.

20. The wing as claimed in claim 1, further comprising at least one leading edge covert adapted to influence pressure leakage between upper and lower surfaces of the wing.

21. The wing as claimed in claim 20, wherein the at least one leading edge covert has a profile rear edge adapted to register with respective spaces between planar wing surfaces of the feather ribs.

22. The wing as claimed in claim 1, adapted to exhibit splayed wing surfaces in a first wing state and tucked wing surfaces in a tucked state.

23. The wing as claimed in claim 22, wherein adjacent tucked wing surfaces have respective degrees of overlap.

24. The wing as claimed in claim 22, wherein the adjacent splayed wing surfaces have respective degrees of overlap.

25. The wing as claimed in claim 22, wherein adjacent tucked wing surfaces have respective degrees of overlap.

26. The wing as claimed in claim 1 adapted to at least one of deflect or deform in a predetermined direction in response to respective loading.

27. The wing as claimed in claim 26 in which the predetermined direction is caudally.

28. The wing as claimed in claim 1, wherein the wrist joint comprises profiled upper and lower portions arranged during actuation to present a profiled surface corresponding to the profiled leading section.

29. A vehicle having a body bearing a wing as claimed in claim 1.

\* \* \* \* \*